Patented Apr. 3, 1923.

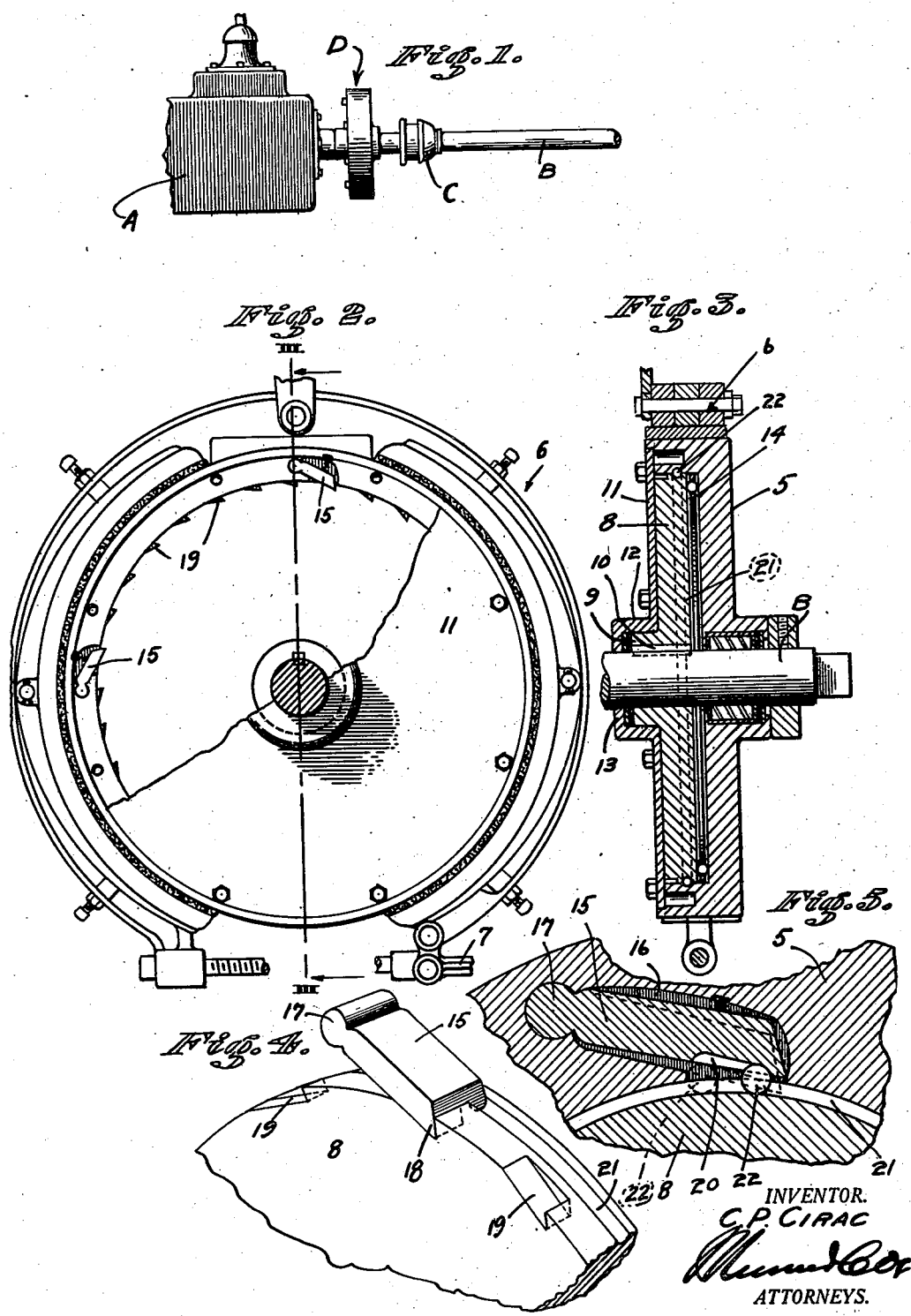

1,450,409

UNITED STATES PATENT OFFICE.

CHARLES PAUL CIRAC, OF FALLON, NEVADA.

REVERSE-MOVEMENT CONTROL FOR DRIVING AND DRIVEN ELEMENTS.

Application filed July 19, 1921. Serial No. 485,807.

*To all whom it may concern:*

Be it known that I, CHARLES PAUL CIRAC, a citizen of the United States, and resident of Fallon, county of Churchill, and State of Nevada, have invented new and useful Reverse - Movement Controls for Driving and Driven Elements, of which the. following is a specification.

My invention relates in general to reverse movement control mechanisms for driving and driven elements, and has reference more particularly to means for automatically preventing or rather controlling the reverse movement of driving or driven elements, such as a power shaft or the like, so as to lock or at least brake the driving or driven elements as the case may be.

The salient features of my invention may find expression in various types of machine elements and while its use for the purpose of illustration is here shown and will be hereinafter referred to as incorporated in the drive shaft of a motor vehicle, this adaptation is only one of its many uses.

In the accompanying drawing I have shown a preferred construction of the mechanism, in which Figure 1 is a detail view showing a drive shaft and gear set of a motor vehicle illustrating the application of the invention in this particular combination; Figure 2 is a view in front elevation of the mechanism with the front cover plate partly broken away, Figure 3 is a vertical axial section on the line 3—3 of Figure 2; Figure 4 is an enlarged detail view showing the co-operative relationship of one of the locking dogs with the driving disc, and Figure 5 is an enlarged detail view showing the co-operative relationship of one of the locking dogs as confined in the drum with the locking disc.

Referring now to the drawing in detail, attention is directed to Figure 1 wherein "A" represents a conventional type of gear set as used in the transmissioin of a motor vehicle and from which the drive shaft "B" extends to the differential with "C" representing a customary universal joint and "D" representing the reverse movement control.
This figure is used for the purpose of showing the preferred location of the device as contemplated by the invention and its association with the important parts of the motor drive. The arrangement which I contemplate preferably includes an open sided drum (5) which has a smooth even circumference around its outside which is encircled by a conventional type of brake band (6), the latter being constructed in the usual manner and having an actuating link or the like (7) (see Figure 2) which may be relied upon to release or clamp the brake band around the drum (5) with the functioning of the same controlled by a manually operated foot or hand lever positioned within reach of the driver of the vehicle.

The open sided drum (5) is loosely mounted upon the drive shaft "B" and having an internal annular opening of nearly the same diameter as that of the drum but terminating within the circumference of the same to leave a sufficient thickness between the circumference of the drum and the inner circumference of the annular opening. Received within this annular opening is a driving disc (8), the same having an axial hub (9) so that it may be mounted upon the shaft "B" and keyed thereto in driving relation by a key (10). The front face of the drum is closed by a bolted or the like plate (11) which has an axial sleeve (12) with an annular depending flange (13) offset from the end of the hub (9) to leave a space to confine a felted and a metal washer to make an oil tight joint around the shaft, as best shown in Figure 3. The driving disc (8) is spaced from the inside face of the drum (5) by an anti-friction device (14) including ball bearings or the like so as to relieve surface friction between these two parts when the driving disc (8) is rotated with the drive shaft "B", and the drum (5) is held stationary by the brake band (6). It is of course appreciated that the drum (5) is loosely mounted on the drive shaft "B".

The important feature of the invention resides in a construction in which the drive shaft "B" may be controlled to an extent that while it is free to rotate in a direction to drive the ground wheels of the motor vehicle forward at all times, except when the clutch in the drive is out, it is under the control of the chauffeur so that he may prevent a reverse movement of the drive shaft, and consequently the ground wheels, regardless of whether the clutch of the driving mechanism is in or out. In other words, in going up a hill should it become necessary to stop the vehicle on a grade and should it so happen that either the transmission brake or the wheel brake fails to function when applied, or if it is inconvenient or undesirable to use the same, the chauffeur may actuate the brake band (7) of the reverse movement control to clamp the drum (5) in a fixed position and with the driving disc (8) automatically locked, and since the latter is keyed to the drive shaft the same will be held against reverse rotation and through it the drive wheels which will hold the vehicle on the grade. In starting the vehicle again the locking arrangement between the driving disc and the drum (5) is such as to permit forward rotation of the disc and the drive shaft "B" without necessitating the release of the drum (5) which is held rigid by the brake band (6). In other words, I have produced a construction which will enable the chauffeur to maintain the drum (5) rigid without interfering with the forward movement of the vehicle so that when the vehicle stops on a grade it will be prevented from moving backwards by an automatic locking of the driving disc (8) with the drum (5). On the other hand, should it become desirable to back the vehicle either on a grade or on the level, the chauffeur may release the brake band (6) which will permit the drum (5) to rotate in a reversed direction with the driving disc "C" so long as the brake band (6) is not clamped around the circumference of the drum.

The above results I have preferably realized by a plurality of dogs which are carried by the drum (5) but made to automatically engage notches in the periphery of the driving disc "C" so that the disc (8) cannot rotate in a reversed direction without carrying with it the drum (5), which, as above stated, is under direct control of the brake band (6). I preferably provide a plurality of these dogs, which are represented by the numerals 15. These locking dogs are four in number and arranged equi-distant around the inner circumference of the annular opening in the drum (5). Each locking dog is pivotally mounted in a separate pocket (16) in the thickness of the drum (5) between the outer braking circumference and the inner circumference of the annular opening. In realizing this pivotal mounting for the dogs, I preferably construct the drum with a semi-cylindrical opening in back of each pocket (16) so that the locking dogs may be inserted in the pocket (16) by sliding them laterally of the drum with the end (17) inserted in the openings, which, as above described, are made to confine them. The shape of the pocket (16) will leave the locking dogs free to rock about their pivotal mountings so that while the driving disc (8) is rotated in clockwise direction they will be maintained out of contact with the disc and practically totally included within their pockets, but just as soon as the driving disc is rotated in a reverse direction they are automatically rocked about their pivots which will leave their bevelled pointed ends (18) free to drop into the notches (19) in the periphery of the disc (8), and it can be readily seen that this position of the locking dogs will arrest rotation of the disc (8) in an anti-clockwise direction so long as the drum (5) is held rigid by the brake band (6), but when the brake band (6) is released then the driving disc (8) with the drum (5) is left free to rotate in synchronism in an anti-clockwise direction.

In constructing these dogs so that they will function automatically as well as noiselessly, I prefer to construct one side of the bottom surface of each dog with an elongated under-cut notch (20), as best shown in Figure 5, with the ball race (21) around the circumference of the disc (8) in back of the notches (19) and with ball bearings (22), one for each locking dog, confined in the under-cut notches (20) and the ball race (21) so that when the disc (8) is urged to rotate in an anti-clockwise direction each of the balls (22) will be moved in their respective under-cut notches (20) toward the free end of the locking dogs which will rock the dogs about their pivotal mountings and receive them in their respective pockets (16) out of engagement with the notches in the driving disc (8), which will leave the disc free to rotate with the drive shaft "B" in a clockwise direction. Just as soon as the reverse movement of the disc (8) begins, caused for instance by a backward movement of the vehicle, the balls (22) will be urged away from the ends (18) of the locking dogs in the under-cut notches (20) which will leave the locking dogs free to fall into the notches (19) and thus locking the disc (8) with the drum (5) and preventing a reverse rotation of the drive shaft "B," providing, of course, the brake band (6) is clamped around the drum (5), otherwise the drive shaft "B" will naturally be free to rotate in a reverse direction but with the disc (8) and the drum (5) locked together and likewise rotating; then just as soon as the brake band (6) is clamped to the drum (5) the shaft "B" will be arrested in its reverse rotation, at the same time it is free to rotate in clockwise direction which leaves the ground wheels of the vehicle free to be driven forward.

As best shown in Figure 4, the pointed end (18) of the locking dogs are received in the notches (19) with the elongated under-cut notches (20) made in the opposite under side of the dogging devices, and with the front edges of the dogs beyond the points (18) rounded off and of a width to be received in the race (21) so that the dogs straddle the thickness of the circumference of the disc between the notches (19) and the race (21).

I claim:

1. In a reverse movement control for driving or driven elements, a drum mounted with freedom of rotation on said element, a disc housed within the drum and mounted to rotate with said element, means automatically connecting the disc in driving relation with the drum upon rotation in one direction, and means for arresting the rotation of the drum in both directions and through it the disc in a reverse direction, said automatic connecting means comprising a plurality of locking dogs pivotally mounted within the drum, notches on the periphery of the disc, means for automatically urging the locking dogs in said notches when the disc is rotated in one direction, and means capable of urging the dogs out of said notches when the disc is rotated in the opposite direction.

2. In a reverse movement control for driving or driven elements, a drum mounted with freedom of rotation on said element, a disc housed within the drum and mounted to rotate with said element, means automatically connecting the disc in driving relation with the drum upon rotation in one direction, and means for arresting the rotation of the drum in both directions and through it the disc in a reverse direction, said automatic connecting means comprising a plurality of locking dogs pivotally mounted within the drum, notches on the periphery of the disc, means for automatically urging the locking dogs in said notches when the disc is rotated in one direction, and means capable of urging the dogs out of said notches when the disc is rotated in the opposite direction, comprising balls housed between the under side of the locking dogs and the circumference of the disc with the under-side of the locking dogs made to permit a limited movement of the balls to and from the ends of the dogs.

3. In a reverse movement control for driving or driven elements, a drum mounted with freedom of rotation on said element, a disc housed within the drum and mounted to rotate with said element, means automatically connecting the disc in driving relation with the drum upon rotation in one direction, and means for arresting the rotation of the drum in both directions and through it the disc in a reverse direction, said automatic connecting means comprising a plurality of locking dogs pivotally mounted to function between the drum and the locking disc, means for automatically urging the dogs into inactive position relative to the locking disc when the disc is rotated in one direction, and means for automatically urging the dogs into active position relative to the locking disc when the disc is rotated in an opposite direction.

4. In a reverse movement control for driving or driven elements, a drum mounted with freedom of rotation on said element, a disc housed within the drum and mounted to rotate with said element, means automatically connecting the disc in driving relation with the drum upon rotation in one direction, and means for arresting the rotation of the drum in both directions and through it the disc in a reverse direction, said automatic connecting means comprising a plurality of locking dogs pivotally mounted to function between the drum and the locking disc, means for automatically urging the dogs into inactive position relative to the locking disc when the disc is rotated in one direction, and means for automatically urging the dogs into active position relative to the locking disc when the disc is rotated in an opposite direction, said first named means comprising balls confined between the locking disc and the drum by the dogs with the dogs constructed to permit a limited movement of the balls to and from their respective ends, and said second named means comprising springs positioned upon the top of the dogs adapted to impose a downward thrust on the ends of the same.

5. In a reverse movement control for driving or driven elements, a drum mounted with freedom of rotation on said element, a disc housed within the drum and mounted to rotate with said element, means automatically connecting the disc in driving relation with the drum upon rotation in one direction, and means for arresting the rotation of the drum in both directions and through it the disc in a reverse direction, said automatic connecting means comprising a plurality of locking dogs, a pocket in the inner circumference of the drum for each dog and in which they are pivotally mounted, notches in the circumference of the locking disc in which said dogs engage, and means for automatically controlling the engagement of the dogs in said notches, comprising balls, under-cut elongated notches in the under side of the dogs and a ball race on the circumference of the locking disc with said elongated notches confining the balls in said race and permitting a limited movement of the balls to and from the ends of the dogs, whereby rotation of the locking disc in one direction will cause the balls to urge the locking dogs out of engagement with the notches in the circumference of the disc, but with the dogs moved upon rotation of the locking disc in a reverse direction to permit the dogs to engage said notches.

6. In a reverse movement control for driving or driven elements, a drum mounted with freedom of rotation on said element, a disc housed within the drum and mounted to rotate with said element, means automatically connecting the disc in driving relation with the drum upon rotation in one direction, and means for arresting the rotation of the drum in both directions and through it the disc in a reverse direction, said automatic connecting means comprising a plurality of locking dogs, a pocket in the inner circumference of the drum for each dog and in which they are pivotally mounted, notches in the circumference of the locking disc in which said dogs engage, and means for automatically controlling the engagement of the dogs in said notches, comprising balls, under-cut elongated notches in the under side of the dogs and a ball race on the circumference of the locking disc with said elongated notches confining the balls in said race and permitting a limited movement of the balls to and from the ends of the dogs, whereby rotation of the locking disc in one direction will cause the balls to urge the locking dogs out of engagement with the notches in the circumference of the disc, but with the dogs moved upon rotation of the locking disc in a reverse direction to permit the dogs to engage said notches, and spring means on top of the dogs for urging said engagement.

CHARLES PAUL CIRAC.